March 24, 1964 J. HRDINA 3,125,961
DRIVING MECHANISM PARTICULARLY FOR MICROPUMPS
Filed Sept. 4, 1962
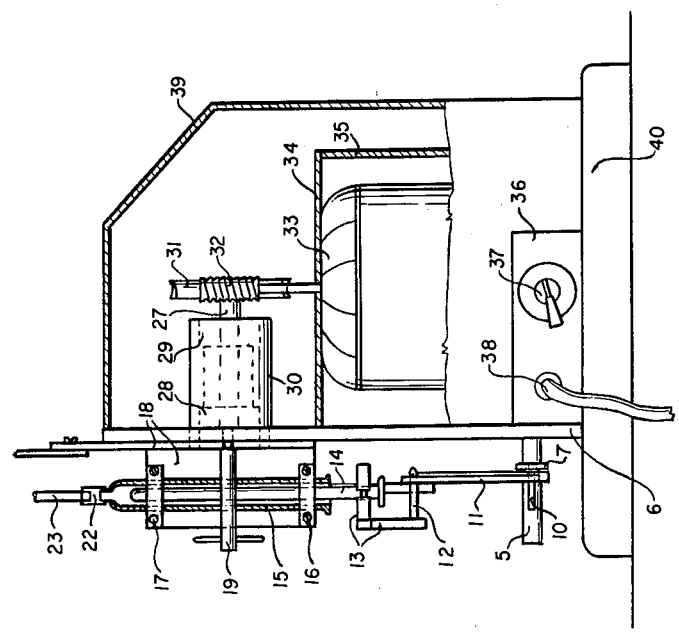
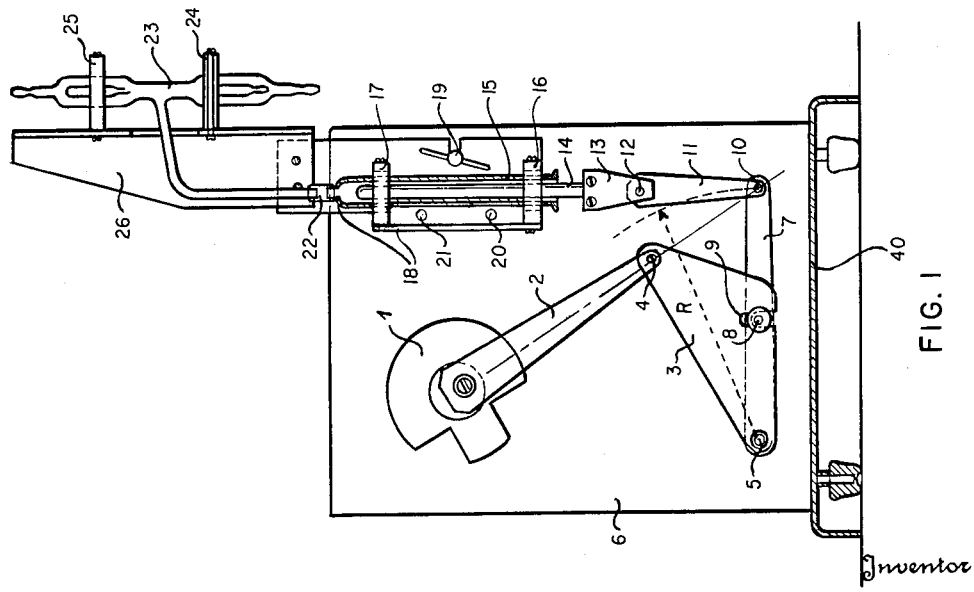
Inventor
JIRI HRDINA
By
Attorney United States Patent Office 3,125,961
Patented Mar. 24, 1964

3,125,961
DRIVING MECHANISM PARTICULARLY
FOR MICROPUMPS
Jiri Hrdina, Prague, Czechoslovakia, assignor to Ceskoslovenska Akademie Ved, Prague, Czechoslovakia
Filed Sept. 4, 1962, Ser. No. 221,110
1 Claim. (Cl. 103—38)

My invention relates to driving mechanisms particularly suitable for micropumps used for example in chromatography.

The known driving mechanisms of that type are not satisfactory. They cannot, or at least not easily be applied to pumps having an upstanding cylinder this being important to permit bubbles to quickly escape therefrom; they cannot be easily dismounted to gain access to the pump cylinder and the pump piston or plunger; and they cause substantial lateral pressures on the pump piston or plunger, this resulting in accelerated wear or even cracking of the parts of the pumps particularly when the same are made of glass.

It is an object of my invention to provide driving means for micropumps or the like which will avoid the said disadvantages.

According to my invention the pump piston or plunger is reciprocated in an upstanding cylinder by a lever assembly operating substantially in a plane containing the vertical cylinder axis.

The said and other objects of my invention will be more fully understood from the following specification when read with the accompanying drawing in which one embodiment of my invention is illustrated; FIG. 1 shows one side view thereof and FIG. 2 the opposite side view.

A pitman 2 is actuated by the rotating eccentric disk 1 keyed upon a driving shaft 27 and is articulated by pin 4 to a rocking plate-shaped lever member 3 which is swingably mounted on journal 5 fixedly seated in a vertical frame plate 6. The journal 5 also swingably supports another lever 7 which may be positionally adjusted relative to the lever member 3 by a set screw 8 laterally extending therefrom and adjustably engaging an oblong recess 9 in said member 3. The outer end of lever 7 is articulated by the pin 10 to the lower end of the connecting rod 11 which at its upper end is articulated by the pin 12 to the cross head 13 attached to a piston rod or plunger 14 reciprocating in the cylinder 15 of the micropump. The pump cylinder 15 is attached by sleeves 16, 17 to an angle iron support 18 which is adjustably secured to the said vertical frame plate 6 by means of the manually settable screw 19 and the pins 20, 21. The discharge opening of the cylinder 15 is connected over a bushing 22 to the valve box 23 which is secured by sleeves 24, 25 to an extension 28 of said angular support 18. The valve box 23 may be provided with a not shown removable cover attachable to said support extension 28.

It will be well understood that by changing the position of the set screw 8 in the recess 9 the plunger 14 may be positionally adjusted in the pump cylinder 15 whereby the size of the dead space therein may be regulated, and further that after loosening the set screw 8 and thereby disengaging the lever 7 from the lever member 3 the pump may be operated manually or the apparatus easily disassembled so that it may be cleaned, sterilized or reconditioned. The said sleeves 16, 17 and 24, 25 may embrace the pump cylinder 15 and the valve box 23, respectively, elastically, what may be desirable if said cylinder and said box are made from glass or other breakable material.

As appearing from the drawing the drive mechanism is located substantially in one plane on one side of the vertical frame plate 6 so that said mechanism will be simply operable and will be resistant to wear even under unfavorable working conditions.

To minimize the effect of any possible play between the elements of the drive mechanism it is desirable that the axis of the pin 10 while located in an extension of the axis of the piston rod or plunger 14 be also located in an extension of the longitudinal axis of the pitman 2, or that the pins 4 and 10 move on arcs of a circle defined by the swing radius R, the chords of said arcs substantially coinciding with the axis of pitman 2 and of the connecting rod 11, respectively, in their central positions shown in FIG. 1.

While the above described driving mechanism and the pump cylinder are arranged on one side of the vertical frame plate 6, the actuating means for said driving mechanism are arranged on the other side of said plate 6 as appearing from FIG. 2. The shaft 27 of the eccentric disk 1 rotates in ball bearings 28, 29 which are enclosed in a tubular casing 30 attached to the frame plate 6. A worm wheel 31 also mounted on said shaft 27 is engaged by the worm 32 driven by the electric motor 33. This motor may be suspended from a horizontal slab 34 attached to the frame plate 6. The said assembly may be protected by a cover 39 through which passes the electric cable 38 of the motor and on which is mounted the motor switch 37. The cam 39 and/or the apparatus base 40 may be provided with ventilating openings (not shown) to admit cooling air to the motor. The electric motor used in the device may be any standard motor used in phonographic or magnetophonic recorders.

The advantages achieved by the present invention will be apparent to anyone familiar with the art. The new driving mechanism which is unusually compact and can be arranged practically within a plane, permits to mount the cylinder of the micropump with its axis in substantially vertical position so that detrimental bubbles may easily escape therefrom; it is easily dismountable to permit access to its parts and to the parts of the pump; and it prevents the appearance of any lateral pressures upon the piston or plunger of the pump thereby avoiding an accelerated wear and/or cracking of the pump cylinder and the piston or plunger, particularly if the same are made from glass.

What I claim as my invention is:

In a micropump particularly for use in chromatography the improvement comprising in combination
(a) a vertical frame plate,
(b) a horizontal drive shaft rotatably mounted in said frame plate;
(c) a substantially vertical pump cylinder with a pistonlike member reciprocable therein, and operating means for said pistonlike member actuated by said drive shaft, said cylinder and said operating means mounted on one side of the frame plate;
(d) the said operating means including an eccentric mounted on said shaft, a pair of levers in angular relation rotatably mounted at their coinciding ends upon said frame plate, means adapted to adjustably couple said levers in different angular relationship, a pitman operatively connecting said eccentric and the outer end of one of said levers, a connecting rod articulately connecting the outer end of the other lever with the pistonlike member, the longitudinal axis of said connecting rod in its intermediate position coinciding with the axis of the pistonlike member, and the extended longitudinal axis of the pitman in its intermediate position passing through the articulated outer end of said other lever;

(e) an electric driving means for said drive shaft mounted on the other side of the frame plate.

References Cited in the file of this patent

UNITED STATES PATENTS

| | | |
|---|---|---|
| 2,548,738 | Orlich et al. | Apr. 10, 1951 |
| 2,737,896 | Neyer | Mar. 13, 1956 |
| 2,830,455 | Harmon | Apr. 15, 1958 |
| 2,898,867 | Saalfrank | Aug. 11, 1959 |